United States Patent [19]

Seals

[11] Patent Number: 5,251,341
[45] Date of Patent: Oct. 12, 1993

[54] BICYCLE TOOL

[76] Inventor: Robert L. Seals, 13524 Autumn La., Chico, Calif. 95926

[21] Appl. No.: 34,757

[22] Filed: Mar. 18, 1993

[51] Int. Cl.⁵ ............................................. B25B 13/00
[52] U.S. Cl. ......................................... 7/138; 81/437; 59/7; 280/288.4; 74/551.8
[58] Field of Search ..................... 7/138, 165; 81/437; 59/7; 280/288.4; 74/551.8

[56] References Cited

U.S. PATENT DOCUMENTS

| D. 322,208 | 12/1991 | Shaw | 59/7 X |
| 4,712,592 | 12/1987 | Brown | 280/288.4 X |
| 4,856,364 | 8/1989 | Dixon | 280/288.4 X |
| 4,967,435 | 11/1990 | Seals | |

FOREIGN PATENT DOCUMENTS 2411948  9/1975  Fed. Rep. of Germany ... 280/288.4
4002827  4/1991  Fed. Rep. of Germany ... 280/288.4

Primary Examiner—James G. Smith

[57] ABSTRACT

A multipurpose bicycle tool structured for removable storage within an open-ended tube of a bicycle. The open-ended tube of the bicycle may be the handlebar end or the bottom end of the seat post for example. The bicycle tool preferably includes a plurality of different size hexagonal sockets, a screw driver, a spoke wrench and a bicycle chain breaker which serve to allow the repair or adjustment of the majority of mechanical problems occurring during use of the bicycle. The bicycle tool is releasably securable for storage within the open-ended tube of the bicycle by way of an expandable and contractible member which when expanded or outwardly extended applies frictional adhesion or binding between the expanded member of the tool and the interior wall of the open-ended tube of the bicycle.

4 Claims, 6 Drawing Sheets

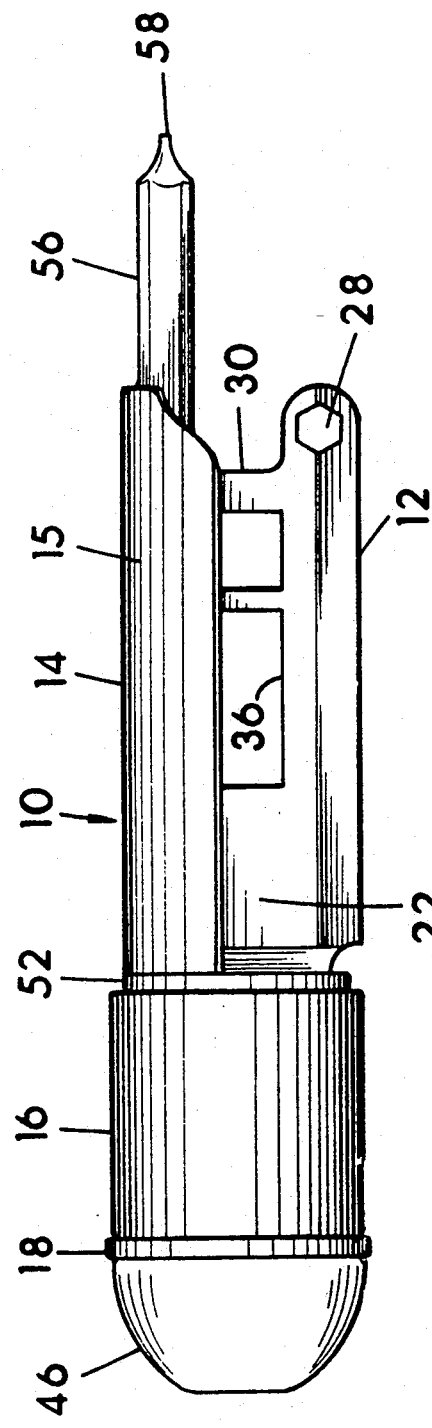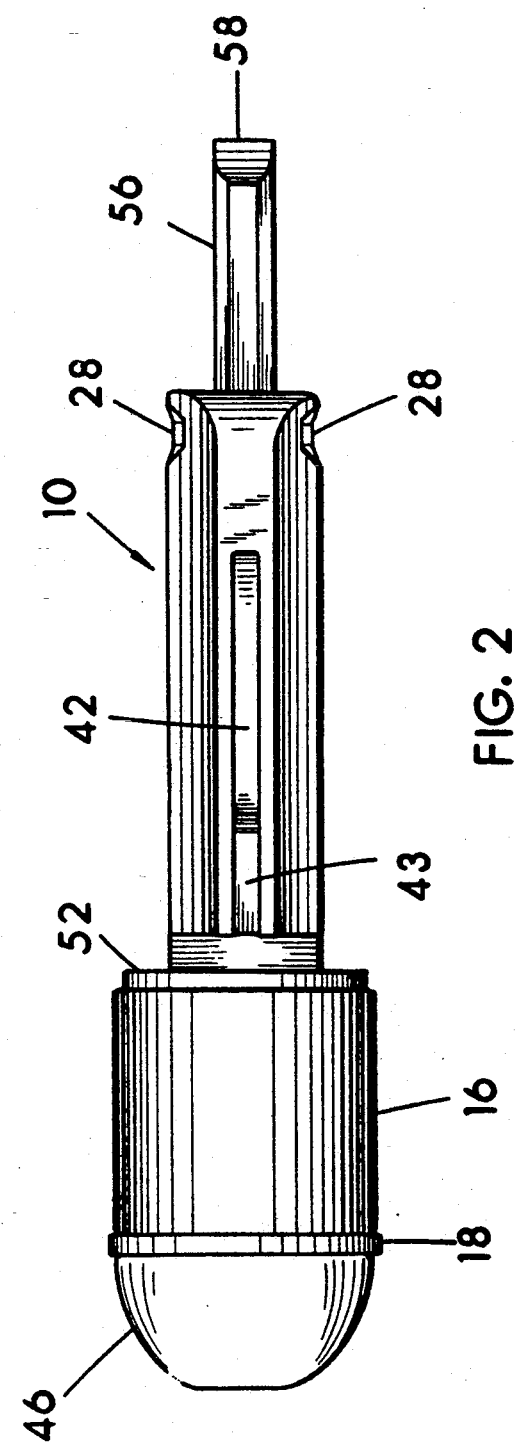

BICYCLE TOOL

BACKGROUND OF THE INVENTION

1. Field of the Invention

This invention relates to a hand tool which serves as a chain breaker for removing damaged links in bicycle chain. The tool also preferably includes features which allow for the manipulation of fasteners such as nuts, bolts, and screws on bicycles. The tool is structured for removable storage within an existing open-ended tube of the bicycle, such as in one end of the handlebar or in the bottom open end of the seat post for example.

2. Description of the Prior Art

There exists prior art multipurpose bicycle tools for implementing various repairs or adjustments on the bicycle while on the road. One such device is a multipurpose bicycle tool kit disclosed in U.S. Pat. No. 4,967,435, which was issued to me, Robert L. Seals on Nov. 6, 1990, and since this prior art tool includes a chain breaker and multiple other tools, my U.S. Pat. No. 4,967,435 is herein incorporated by reference for essential and non-essential information. While the reference prior art device is structured for repairing and adjusting bicycles and does work rather well, it must be transported either on the person of the rider or in some specially structured compartment or storage area on the exterior of the bicycle. There is always the disadvantage that the rider may loose or misplace the tool when it is carried on his person, and he must always make a concerted effort to remember to take it along with him. If the tool is not carried on the rider's person, then a special carrying case must be provided to retain the tool. This carrying case must also be affixed on the bicycle where it is not in the way of the rider or the operation of the bicycle. The case not only takes up space on the frame, which is generally already crowded with tire pumps, water containers and the like, but it is also an added expense. Weight is also extremely important to bicycle racers where even ounces are considered, and the added bulk and weight of a carrying case increases weight and wind resistance.

Therefore, there is a need for an improved multipurpose bicycle tool which can be used in a variety of repair or adjustment operations on the bicycle while out on the open road, and which does not need to be carried on the rider's person.

SUMMARY

The detailed description of the present invention is a description of the preferred embodiment, and not the only embodiment contemplated within the scope of the invention, and therefore must not be viewed in a limiting manner as the only mode for carrying out the present invention. The preferred embodiment of the present invention is a multipurpose bicycle tool provided in separate interlocking sections or members which serve a particular service or repair function either alone or in conjunction with one or more of the other members. In combination, the tool provides several hexagonal sockets of different sizes, a screw driver, a spoke wrench and a chain breaker. These specific tools or implements are sized to accommodate most, if not all, of the existing nuts and bolts found on conventional bicycles. Therefore there is generally no need for additional tools to perform the majority of repairs or adjustments experienced by bicyclists while riding.

When the tool is assembled, the overall shape and size of the device allows it to be inserted into the interior of an existing cylindrical portion or tube of the bicycle for storage. Two such storage areas which are suggested are the distal open end of the handlebars and the bottom open end of the seat post to which the seat is affixed. The open end of the handlebars is a preferred storage area since it would be readily accessible to the rider, whereas storage within the seat post requires the removal of the seat post with seat from the seat tube to gain access to the open distal end of the seat post.

The present tool is structured to be securely affixed to the interior of the tube of the bicycle with the use of an expandable cylindrical plug. The expandable plug engages the interior surface of the tubular member as it is compressed longitudinally between two other members of the tool, by rotation of a threaded shaft. The end or head of the threaded shaft is positioned outside the open end of the tubular member of the bicycle and is rotated with the use of an allen wrench in this example of the invention. The present invention works particularly well when used in conjunction with a second device, which will be described later, wherein an appropriately sized allen wrench is incorporated as a component part of the bicycle, and is therefore available to the rider without carrying it on his person. When not in use the present invention is secured in the handlebar or seat post of the bicycle where it cannot be forgotten and where it will not be in the rider's way. It also offers no wind resistance, and adds very little appreciable weight.

Other structural and functional features, advantages and benefits of the present invention will become apparent from examination of the accompanying drawings, detailed description, and claims.

BRIEF DESCRIPTION OF THE DRAWINGS

FIG. 1 is a left side elevational view of the assembled tool with the right side elevational view appearing essentially the same;

FIG. 2 is a bottom plan view of FIG. 1;

DESCRIPTION OF THE PREFERRED EMBODIMENT

Figure 3:
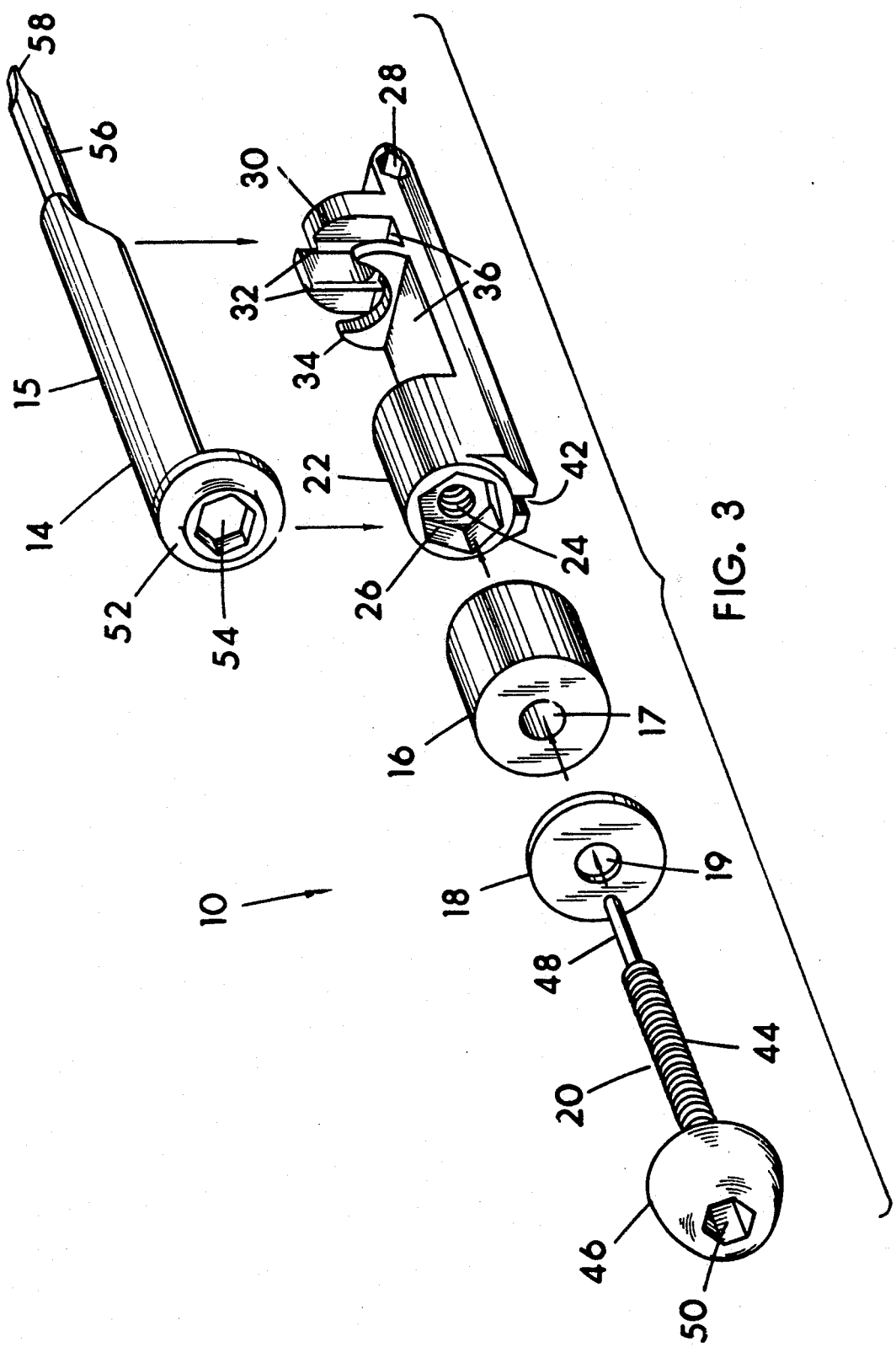
FIG. 3 is an exploded perspective view of the component parts of the invention.

Referring now to the drawing FIGS. 1-7 where a preferred embodiment of the present invention, generally referred to as bicycle tool 10, is illustrated in various views. Preferably, bicycle tool 10, with the exception of resilient plug 16, is comprised of some type of steel, although other suitably rigid and strong materials can be used, such as titanium, plastics, ceramics, carbon fiber and alloys and combinations thereof. Bicycle tool 10 in this example essentially includes main body 12, auxiliary member 14, resilient plug 16, washer 18, and push pin 20. Main body 12 is generally comprised of an elongated generally rectangular base having a first end and an oppositely disposed second end, and a generally flat top surface and an oppositely disposed beveled bottom surface. The first end of the top surface is affixed with a cylindrical head 22 having a longitudinal threaded bore 24 completely therethrough, with two flat vertical ends as may be seen in FIG. 3. The exterior end of head 22 also contains a hex socket 26, preferably nine millimeters in size. Contained within the second end of the base of main body 12 is a small transverse bore or hexagonal receiver socket 28, which is preferably four millimeters in size so as to receive shaft 56 as will be understood with continued reading. Adjacent to receiver socket 28, on the top surface of main body 12, is anvil 30 which is part of the chain breaker of the tool 10. Anvil 30 includes a narrow semicircular shaped member, positioned transversely on the top surface, having an open vertical central channel which basically separates anvil 30 into two sections. The interior surface edges of anvil 30 adjacent the channel are affixed with vertical ribs or anvil stand-offs 32 extending outward in the direction of head 22 as may be seen in FIG. 3. Located adjacent anvil 30 on the top surface of main body 12 is link support member 34. Link support member 34 is a short, narrow U-shaped prominence which is also positioned transversely onto the top surface of main body 12 between head 22 and anvil 30. The flat area of the top surface adjacent either side of link support member 34 is referred to as chain rest 36. Anvil 30 and link support member 34 are structured to retain a link of bicycle chain 38, the process of which is described in the reference patent and will also be further explained later. The bottom surface of main body 12 is flat with inwardly beveled lateral sides 40 which help render tool 10 diametrically small and insertable in a small cylindrical tube as will be understood with continued reading. An elongated narrow central channel extends lengthwise on the bottom surface with the terminal end of the channel adjacent and below head 22 being open and slightly recessed at 43 in FIG. 2 for use as a spoke wrench 42, which will be further explained later.

Figure 5:
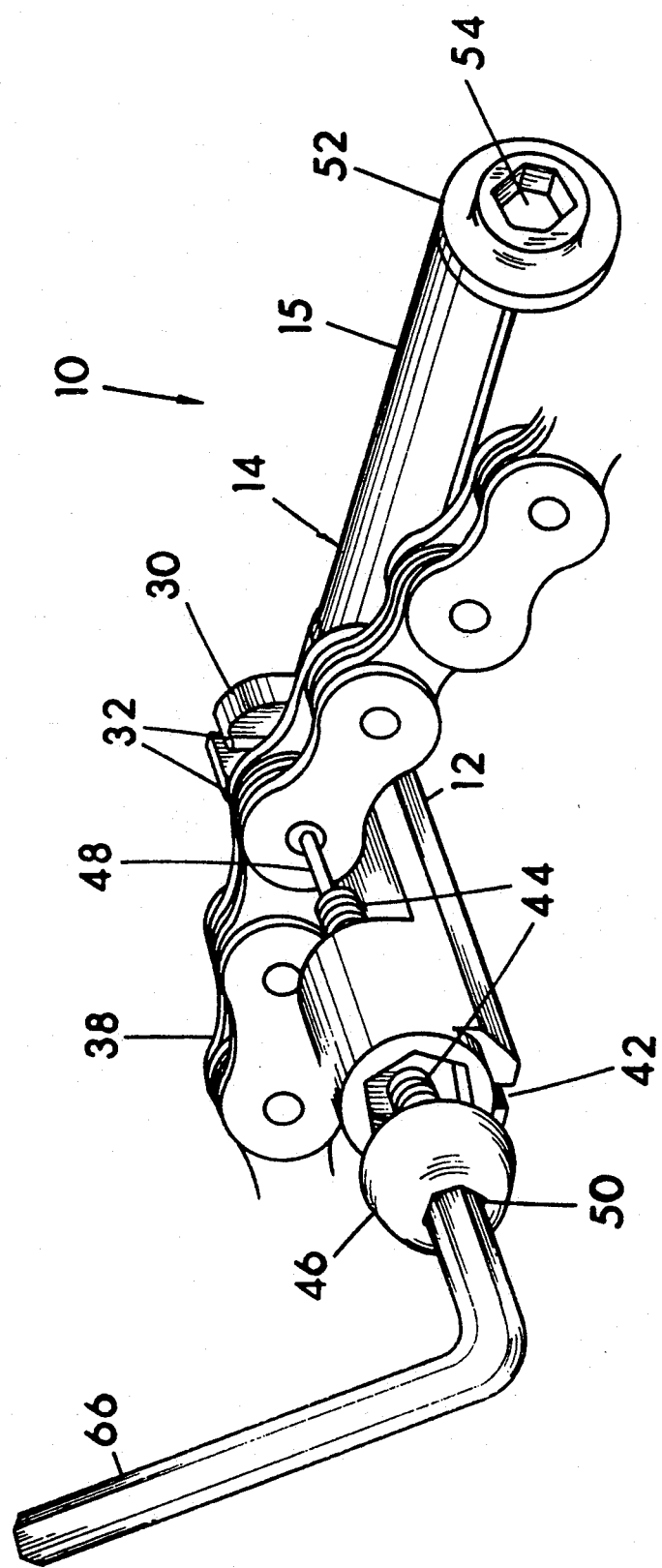
FIG. 5 illustrates another use of the tool as a chain breaker for removing links in a bicycle chain.
Figure 6:
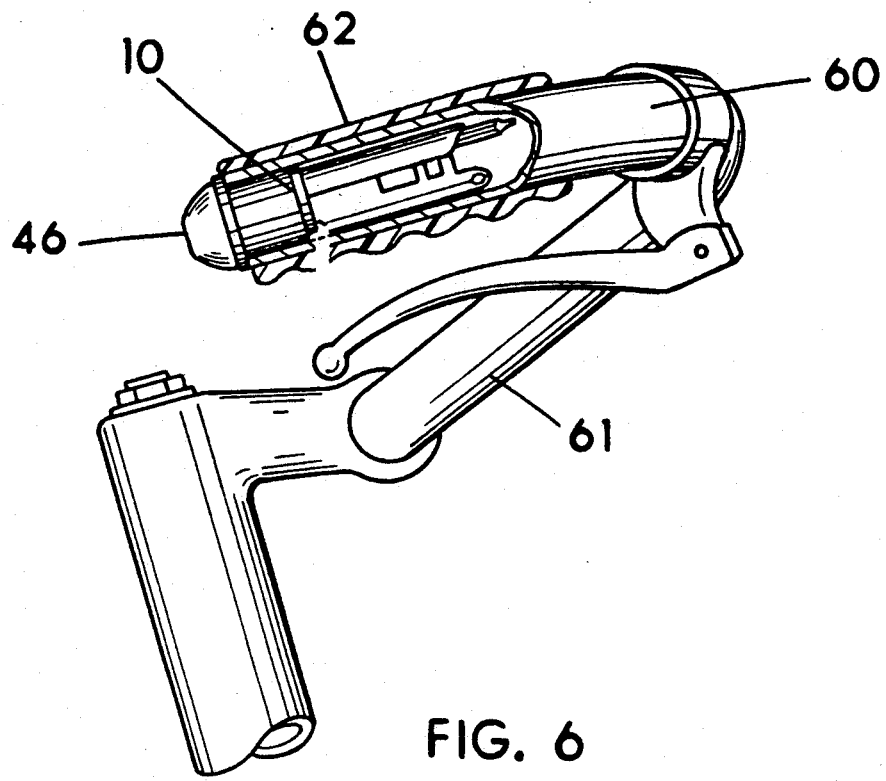
FIG. 6 depicts the tool stored within the handlebar of the bicycle.

Push pin 20 of tool 10 includes an elongated threaded shaft 44 affixed on one end with a widened dome shaped head 46, and on the opposite end with a narrow link ejector rod 48. Threaded shaft 44 is sized for threaded engagement within threaded bore 24 of head 22 so that ejector rod 48 is aiming toward anvil 30 as shown in FIG. 5. Link ejector rod 48 is sized slightly smaller in diameter than the link pins of conventional bicycle chains 38. The distal or domed end of head 46 contains hex socket 50, preferably six millimeters in size, with the base of head 46 being flat. The distal or domed end of head 46 is domed in shaped so it may serve as a handlebar end plug when stored in the otherwise open end of the handlebar 61 as shown in FIG. 6, with this sometimes being important since many organized bicycle races require the ends of the handlebars to plugged or rendered blunt for safety reasons.

Another member of bicycle tool 10 is auxiliary member 14. Auxiliary member 14 includes a thin elongated panel 15 having downward curving lateral sides with one end affixed to a flat annular plate 52. Annular plate 52 is positioned perpendicular to the elongated panel 15, and is edgewardly affixed to the curved end thereof oppositely disposed from shaft 56. The central section of plate 52 contains a slightly raised, open ended, hex socket 54, preferably eight millimeters in size. The opposite end of the elongated panel 15 narrows and is centrally affixed with a longitudinal short hexagonal shaft 56, approximately four millimeters in diameter. Shaft 56 in this example is affixed to plate 15 by welding. The distal end of shaft 56 is structured into the tip of a screwdriver 58, and in this example it is a straight blade screwdriver.

Bicycle tool 10 includes a flat annular rigid washer 18 having a central aperture 19 sized slightly larger than the external diameter of threaded shaft 44. The overall diameter of washer 18 is approximately equal in diameter to plate 52. Washer 18 is to distribute pressure applied to resilient plug 16, and to allow rotation of head 46 without the rotational forces being carried through to plug 16 as will be better understood with continued reading. Plug 16 is a short cylindrical rubbery and resilient member having a central aperture 17 sized slightly larger than the external diameter of threaded shaft 44. Plug 16 has been found to function well with the majority of seat posts and handlebars when the plug 16 is sized about 0.75 inches in diameter. This diameter of plug 16 of course may be changed within the scope of the invention. Plug 16 is expandable in diameter when endward pressure is applied, and being resilient, the plug 16 returns or contracts to its smaller relaxed diameter when the endward pressure is relieved as will be better understood with continued reading. Washer 18 and plug 16 primarily function to retain the assembled bicycle tool 10 within the hollow bicycle frame member 60, and are removed from shaft 44 during use of the chain breaker component of the tool.

To utilize bicycle tool 10 as a bicycle chain 38 breaker, main body 12, push pin 20 and auxiliary member 14 are used, as shown in FIG. 5. Threaded shaft 44 of push pin 20 is first inserted into threaded bore 24 of main body 12 and threadably advanced until link ejector rod 48 emerges through the opposite side of threaded bore 24. Hexagonal shaft 56 of auxiliary member 14 is then inserted into hex receiver socket 28 of main body 12, where it extends perpendicular to body 12 and serves as a lever or handle for the user to better grip and to prevent rotation of main body 12 during the process. A link of a bicycle chain 38 is then placed over link support member 34, with the tips of link support member 34 inserted into the spaces between the links. This aligns the link pin of the bicycle chain 38 link with the distal tip of link ejector rod 48. Link ejector rod 48 is than advanced by rotating push pin 20 with the use of an allen wrench 66 inserted into socket 50. As link ejector rod 48 is advanced, it pushes against the link pin and forces it out of connection within the bicycle chain 38 link and into the channel in anvil 30. Anvil stand offs 32 primarily serve to support racing bicycle chains 38 having curved side panels, but also function well to support all conventional bicycle chains 38.

Figure 4:
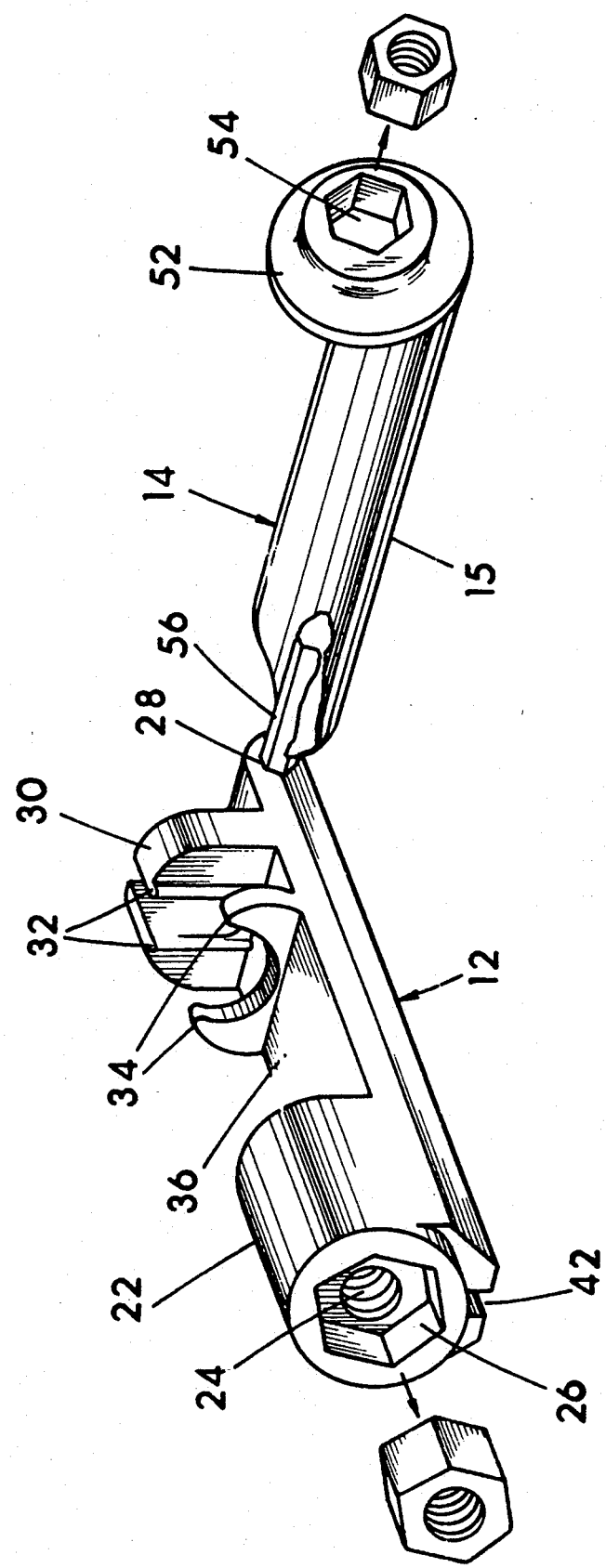
FIG. 4 illustrates one use of the tool as a socket wrench, with one socket located on the left end of the main body with the auxiliary member attached on the right end thereof, serving as a handle or lever; the auxiliary member can also be used as a socket wrench with the main body used as the lever or handle.

To utilize the nine millimeter socket 26 in head 22, auxiliary member 14 is used as a lever by inserting hexagonal shaft 56 into hexagonal receiver socket 28 in order to gain rotational strength when manipulating hexagonal nuts or bolt head, and likewise, main body 12 is used as a lever when utilizing socket 54 in auxiliary member 14 as may be ascertained from FIG. 4.

To use spoke wrench 42, main body 12 is positioned on end with the open end of spoke wrench 42 beneath head 22 positioned around the nut of the wheel spoke, and the spoke positioned within the lengthwise channel of spoke wrench 42. Main body 12 is then rotated, turning the nut on the spoke in the desired direction.

Figure 7:
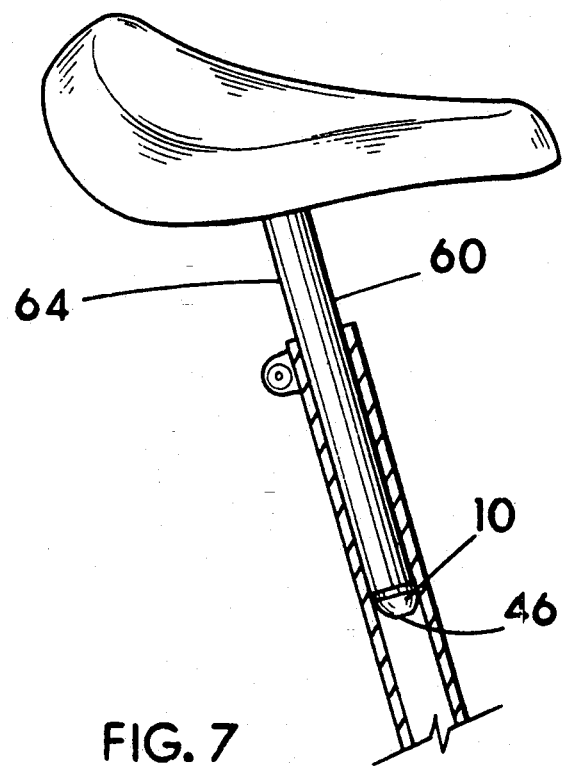
FIG. 7 depicts the tool stored within the seat post which supports the seat, with the seat post inserted into the seat tube of the bicycle.

To assemble all component parts of bicycle tool 10, washer 18 is first inserted over threaded shaft 44 of push pin 20, followed by resilient plug 16. Auxiliary member 14 is then positioned parallel over the top surface of main body 12 with plate 52 aligned over the side of head 22. Auxiliary member 14 is then lowered onto main body 12 with the open hex socket 54 of plate 52 aligned with threaded bore 24. Threaded shaft 44 is then inserted through the open hex socket 54 and threadably engaged within threaded bore 24 and advanced until washer 18, plug 16 and plate 52 are snugly compressed between the flat base of the head 46 of threaded shaft 46 and the end of head 22 of main body 12. Once assembled, bicycle tool 10 roughly forms an elongated cylindrical shape due to the downwardly sloping sides of the elongated plate of auxiliary member 14 on the top surface and the beveled lateral sides 40 of the bottom surface of main body 12, which help adapt bicycle tool 10 for insertion into a cylindrical bicycle member 60, such as the handlebar 61 or seat post 64 of most conventional bicycles, as shown in FIGS. 6 and 7. Handlebar 61 may have a hand grip 62 absent an end wall as shown in FIG. 6. Bicycle tool 10 may then inserted into the open distal end of handlebar 6 or the open bottom end of seat post 64 until plug 16 is completely retained within the bicycle frame member 60. Then push pin 20 is rotated clockwise with the use of allen wrench 66, until resilient plug 16 becomes compressed against washer 18 and plate 52 and begins to expand outward against the interior wall of bicycle frame member 60. Washer 18 basically functions to prevent plug 16 from rotating with head 46 of push pin 20. Once sufficiently expanded, resilient plug 16 will hold bicycle tool 10 securely in position, even within seat post 64 where it is positioned upside down when in the storage position.

Figure 8:
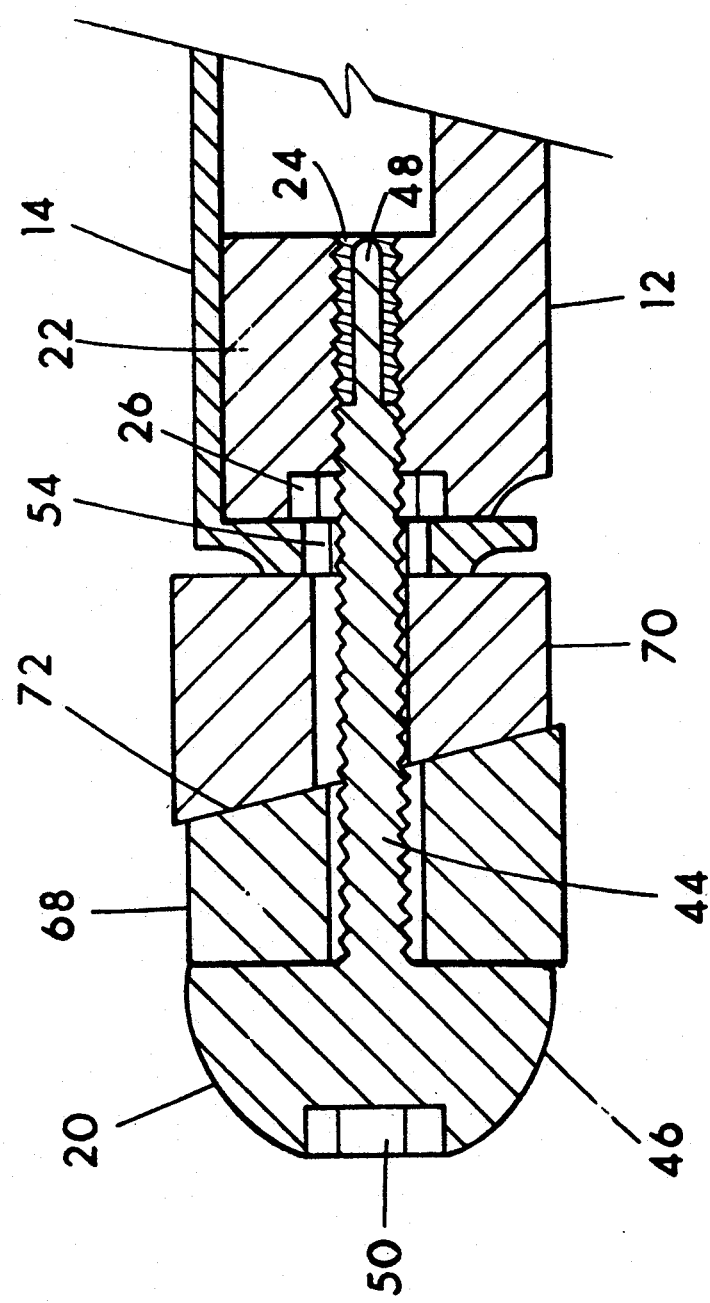
FIG. 8 is an enlarged partial cross section of the bicycle of tool showing a slight variation in the preferred embodiment of the bicycle tool.

An alternative attachment structure is anticipated in place of flat washer 18 and resilient plug 16 which could also be used to retain bicycle tool 10 within bicycle frame member 60. One such anticipated structure, illustrated in FIG. 8, includes a first washer 68 and a second washer 70 with each washer being a wide rigid cylinder each having a central bore and a flat vertical end and an oppositely disposed angled end 72. The outer diameter of washers 68 and 70 is sized slightly smaller than the interior diameter of bicycle frame member 60, with the interior central bore of each washer sized moderately larger than the exterior diameter of threaded shaft 44. When in use, both washers 68 and 70 are positioned over threaded shaft 44 of push pin 20 with both angled ends 72 adjacent one another, with the remaining component parts of the invention assembled as previously mentioned, of course less flat washer 18 and resilient plug 16. Once bicycle tool 10 is inserted into the interior of bicycle frame member 60, push pin 20 is rotated which compresses both washers 68 and 70 together. Since the abutting ends of both washers 68 and 70 are beveled, compressing the two together forces one or both washers 68 and 70 off to the side. This forces the sides of washers 68 and 70 to press against the interior wall of frame member 60 and retains bicycle tool 10 in position. FIG. 8 shows the washers 68 and 70 in the widened or expanded position. Washers 68 and 70 essentially form an expandable and contractible arrangement much the same as with the resilient plug 16.

Although not shown in the drawings, the present invention of the bicycle tool 10 works best when used in conjunction with the multipurpose tool and bicycle seat clamp combination of my co-pending U.S. patent application, Ser. No. 07/994,267 filed on Dec. 21, 1992 titled Multipurpose Tool and Bicycle Seat Clamp Combination. The bicycle seat clamp of that application includes a removable modified allen wrench, which also serves as a handle, which is sized for insertion into socket 50 of push pin 20 of the present invention. When both bicycle tool 10 and the seat clamp of my co-pending application are both affixed to a bicycle, extra accessory tools are generally not required to be carried by the rider since the allen wrench used to manipulate push pin 20 would already be attached to the frame of the bicycle as an integral part.

Other adaptations and modifications can be made to bicycle tool 10 which would increase its versatility yet still allow bicycle tool 10 to be stored within a tubular member of the bicycle frame. Such adaptations could include a transverse hexagonal bore in or through head 46 of push pin 20 sized for insertion of hexagonal shaft 56 of auxiliary member 14. This would allow auxiliary member 14 to serve as a lever so hex socket 50 of push pin 20 could be utilized to manipulate six millimeter sized bolts and nuts. Also, head 46 of push pin 20 could be structured and textured to provide a griping surface for manually rotating push pin 20, thereby removing bicycle tool 10 from the frame member of the bicycle without the use of an additional allen wrench, although the ability to use a lever such as the allen wrench is preferred.

Therefore, changes in the specific structure of the invention, such as those just described and many others, may be made without departing from the true scope of the invention, and it should therefore be understood that the scope of the invention is not to be overly limited by the specification and drawings which are given for example, but is to be determined by the spirit and intended scope of the appended claims.

What I claim as my invention:

1. A hand tool having a chain breaker for manipulating chain links on a bicycle, said hand tool structured for removable storage within an open-ended tube of a bicycle, said hand tool comprising an elongated main body having a chain anvil affixed on a top surface thereof, said main body having a head affixed on said top surface with said head having a threaded bore therethrough with a threadably engaged rotatable push pin within said threaded bore, said push pin having chain link ejector means cooperatively functional with said chain anvil to assist in the dismantling of a drive chain,
    means for securing said hand tool releasably within an open-ended tube of a bicycle for storage,
    said hand tool with said means for securing said hand tool being sized sufficiently small to be at least in part inserted in an open-ended tube of a bicycle, said means for securing said hand tool being affixed to said hand tool and further being outwardly extendable to secure said hand tool stationary within an open-ended tube of a bicycle by pressing against the tube of the bicycle.

2. A hand tool having a chain breaker for manipulating chain links on a bicycle, said hand tool structured for removable storage within an open-ended tube of a bicycle, said hand tool comprising an elongated main body having a chain anvil affixed on a top surface thereof, said main body having a head affixed on said top surface with said head having a threaded bore therethrough with a threadably engaged rotatable push pin within said threaded bore, said push pin having a chain link ejector tip at an end thereof adjacent said chain anvil, said push pin having an enlarged head oppositely disposed from said ejector tip, means for securing said hand tool releasably within an open-ended tube of a bicycle for storage with said means for securing including an expandable and contractible means positioned on said push pin between said head of said main body and said enlarged head of said push pin, said expandable and contractible means being expandable and contractible by way of rotation of said push pin whereby rotation of said push pin in a first direction causes expansion of said expandable and contractible means, and rotation of said push pin in a second direction allows contraction of said expandable and contractible means, said hand tool with said expandable and contractible means in a contracted state being sized sufficiently small to be inserted in an open-ended tube of a bicycle, said expandable and contractible means being sufficiently large in an expanded state to secure said hand tool stationary within a tube of a bicycle by pressing against the tube of the bicycle.

3. A hand tool having a chain breaker and means for manipulating fasteners on a bicycle, said hand tool structured for removable storage within an open-ended tube of a bicycle, said hand tool comprising an elongated main body having a chain anvil affixed on a top surface thereof, said main body having a head affixed on said top surface with said head having a threaded bore therethrough with a threadably engaged rotatable push pin within said threaded bore, said push pin having a chain link ejector tip at an end thereof adjacent said chain anvil, said push pin having an enlarged head oppositely disposed from said ejector tip, a transverse bore in said main body, an elongated auxiliary tool insertable into said transverse bore so as to provide means to assist in preventing rotation of said main body during use of said chain breaker, said auxiliary tool having at least one end thereof suitably structured to serve a fastener manipulation tool, said auxiliary tool storable on said main body in lengthwise parallel alignment with said main body, means for securing said auxiliary tool releasably in the stored position on said main body, means for securing said hand tool releasably within an open-ended tube of a bicycle for storage with said means for securing including an expandable and contractible means positioned on said push pin between said head of said main body and said enlarged head of said push pin, said expandable and contractible means being expandable and contractible by way of rotation of said push pin whereby rotation of said push pin in a first direction causes expansion of said expandable and contractible means, and rotation of said push pin in a second direction allows contraction of said expandable and contractible means, said hand tool with said expandable and contractible means in a contracted state being sized sufficiently small to be inserted in an open-ended tube of a bicycle, said expandable and contractible means being sufficiently large in an expanded state to secure said hand tool stationary within a tube of a bicycle by pressing against the tube of the bicycle.

4. A hand tool having a chain breaker and means for manipulating fasteners on a bicycle according to claim 3 further including a spoke wrench in a bottom side of said main body.

* * * * *